United States Patent
Hilling

(10) Patent No.: US 10,330,083 B2
(45) Date of Patent: Jun. 25, 2019

(54) WIND TURBINE AND METHOD FOR OPERATING A WIND TURBINE

(71) Applicant: WOBBEN PROPERTIES GMBH, Aurich (DE)

(72) Inventor: Christoph Hilling, Aurich (DE)

(73) Assignee: WOBBEN PROPERTIES GMBH, Aurich (DE)

(*) Notice: Subject to any disclaimer, the term of this patent is extended or adjusted under 35 U.S.C. 154(b) by 681 days.

(21) Appl. No.: 14/835,566

(22) Filed: Aug. 25, 2015

(65) Prior Publication Data

US 2016/0025069 A1 Jan. 28, 2016

Related U.S. Application Data

(63) Continuation of application No. PCT/EP2014/056542, filed on Apr. 1, 2014.

(30) Foreign Application Priority Data

Apr. 5, 2013 (DE) .................. 10 2013 206 039

(51) Int. Cl.
*F03D 11/00* (2006.01)
*F03D 7/04* (2006.01)
(Continued)

(52) U.S. Cl.
CPC ........... *F03D 7/043* (2013.01); *F03D 1/0675* (2013.01); *F03D 80/40* (2016.05);
(Continued)

(58) Field of Classification Search
CPC ....... F03D 11/0025; F03D 80/40; F03D 7/043
See application file for complete search history.

(56) References Cited

U.S. PATENT DOCUMENTS 7,637,715 B2 * 12/2009 Battisti .................. F03D 80/40
290/55
7,883,319 B2 2/2011 Volkmer
(Continued)

FOREIGN PATENT DOCUMENTS

CN 102822516 12/2012
DE 196 21 485 A1 3/1998
(Continued)

OTHER PUBLICATIONS

English Translation of Chinese Application No. 201480020122.5, Office Action dated May 16, 2017, 3 pages.
(Continued)

*Primary Examiner* — Kayla McCaffrey
(74) *Attorney, Agent, or Firm* — Kilpatrick Townsend and Stockton

(57) ABSTRACT

A wind turbine is having at least one rotor blade, a blade heating system for heating at least a portion of the at least one rotor blade, at least one temperature sensor for sensing the external temperature in the region, or in the environment, of the wind turbine, at least one air humidity sensor for sensing the air humidity in the region, or in the environment, of the wind turbine, and a control unit for activating the blade heating system if the temperature falls below a temperature limit value and if an air humidity limit value is exceeded, the temperature limit value being +5° C. and the air humidity limit value being 70%.

5 Claims, 2 Drawing Sheets

(51) Int. Cl.
  *F03D 1/06*   (2006.01)
  *F03D 80/40*  (2016.01)
(52) U.S. Cl.
  CPC ... *F05B 2270/323* (2013.01); *F05B 2270/325* (2013.01); *Y02E 10/721* (2013.01)

(56) References Cited

U.S. PATENT DOCUMENTS

| | | | |
|---|---|---|---|
| 8,200,451 B2 | 6/2012 | Battisti | |
| 9,415,875 B2 | 8/2016 | Stiesdal | |
| 2008/0181775 A1* | 7/2008 | Livingston | F03D 1/0675 |
| | | | 416/95 |
| 2010/0034652 A1 | 2/2010 | Battisti | |
| 2010/0119370 A1 | 5/2010 | Myhr | |
| 2010/0253079 A1 | 10/2010 | Bolln et al. | |
| 2012/0226485 A1* | 9/2012 | Creagh | F03D 7/048 |
| | | | 703/7 |

FOREIGN PATENT DOCUMENTS

| | | |
|---|---|---|
| EP | 2 029 428 B1 | 10/2011 |
| JP | 2003-187371 A | 7/2003 |
| JP | 2010-071019 A | 4/2010 |
| RU | 2 361 113 C2 | 7/2009 |
| RU | 121 528 U1 | 10/2012 |
| WO | 2004/057182 A1 | 7/2004 |
| WO | 2004/104412 A1 | 12/2004 |
| WO | 2011/131522 A2 | 10/2011 |
| WO | 2014/161862 A1 | 10/2014 |

OTHER PUBLICATIONS

The First Examination Report for New Zealand Patent Application No. 711078, dated Feb. 15, 2016, 2 pages.
Japanese Office Action for JP Patent Application No. 2016-504711, dated Sep. 27, 2016, 2 pages.
Japanese Office Action corresponding to Japanese Patent Application 2016-504711 dated Jun. 20, 2017, 6 pages.
Decision on Grant for corresponding Russian Patent Application No. 2015147110, 8 pages, dated May 22, 2017 (English Translation of Decision on Grant, 6 pages).
International Search Report and Written Opinion of The International Searching Authority for International Application No. PCT/EP2014/056542 dated Jun. 2, 2014, 11 pages.
Ilinca, Analysis and Mitigation of Icing Effects on Wind Turbines www.intechopen.com XP002724712 (Apr. 4, 2011) 39 pages.
Cattin et al., Four years of monitoring a wind turbine under icing conditions IWAIS XIII, Andermatt, Sep. 2009, 5 pages.

* cited by examiner

WIND TURBINE AND METHOD FOR OPERATING A WIND TURBINE

CROSS-REFERENCES TO RELATED APPLICATIONS

This application is a continuation of International Application No. PCT/EP2014/056542, filed Apr. 1, 2014, which claims priority to German Application No. 10 2013 206 039.4, filed Apr. 5, 2013, the entire contents of both of which are incorporated herein by reference in their entirety for all purposes.

The present invention relates to a wind turbine and a method for operating a wind turbine.

Below certain temperatures, ice may form on the rotor blades of a wind turbine. Such an ice formation, or ice build-up, is undesirable, because it may endanger persons or buildings in the environment of the wind turbine if the ice drops off the rotor blades and flies through the area. Moreover, ice formation, or ice build-up, on the rotor blade of a wind turbine results in an altered dynamic behaviour, such that the wind turbines can no longer be operated in an optimum manner.

WO 2004/104412 A1 describes a method for operating a wind turbine in which the temperature in the environment of the wind turbine is sensed. In addition, operating parameters of the wind turbine are sensed. If the sensed operating parameters differ from stored operating parameters, the external temperature is checked. If the external temperature is below a limit value, the operation of the wind turbine can be influenced. If the temperature is above the limit value, however, the stored parameter values are adjusted to the sensed parameters.

WO 2010/131522 A1 describes a method for operating a wind turbine in which the operating parameters of the wind turbine are sensed and compared with predefined reference quantities. If the difference between sensed operating parameters and reference operating parameters exceeds a limit value, the rotor blade is heated in order to remove build-up of ice that has formed.

In the German application establishing priority, the following documents were searched by the German Patent and Trademark Office: DE 196 21 485 A1, US 2010/0034652 A1, US 2010/0119370 and Cattin, R. et al. "Four years of monitoring a wind turbine under icing conditions", 13th International Workshop on Atmospheric Icing of Structures, 11 Sep. 2009, 1 to 5.

It is therefore the object of the present invention to provide a wind turbine, and a method for operating the wind turbine that makes it possible to operate the wind turbine more effectively, even at low temperatures.

This object is achieved by a wind turbine and a method for operating a wind turbine according to the claims.

There is thus a wind turbine having at least one rotor blade, a blade heating system for heating at least a portion of the at least one rotor blade, at least one temperature sensor for sensing the external temperature in the region, or in the environment, of the wind turbine, at least one air humidity sensor for sensing the air humidity in the region, or in the environment, of the wind turbine, and a control unit for activating the blade heating system if the temperature falls below a temperature limit value and if an air humidity limit value is exceeded, the temperature limit value being +5° C. and the air humidity limit value being 70%.

According to one aspect of the present invention, the temperature limit value is +2° C. and the limit value of the air humidity is approximately 95%.

The invention likewise relates to a method for operating a wind turbine, which has at least one rotor blade, a blade heating system for heating at least a portion of the rotor blades, a temperature sensor for sensing the external temperature in the region of the wind turbine, and at least one air humidity sensor for sensing the air humidity in the region of the wind turbine. The blade heating system is activated if the temperature falls below a temperature limit value and if an air humidity limit value is exceeded. The temperature limit value is +5° C. and the air humidity limit value is 70%.

The invention also relates to a wind turbine having a rotor blade, a blade heating system for heating the rotor blade, a temperature sensor for sensing the external temperature in the region of the wind turbine, an air humidity sensor for sensing the air humidity in the region of the wind turbine, and a control unit for activating the blade heating system if the temperature falls below 2° C. and if a limit value of an air humidity gradient is exceeded.

The invention relates to the concept of preventively activating a heating system of a rotor blade, i.e. before ice has built up, or formed, on the rotor blades of the wind turbine. The heating system of the rotor blades is activated in dependence on the external temperature and on the relative air humidity, or on a change in the air humidity.

Further embodiments of the invention constitute subject-matter of the dependent claims.

BRIEF DESCRIPTION OF THE DRAWINGS

Advantages and exemplary embodiments of the invention are explained in greater detail in the following with reference to the drawing.

FIG. 1 shows a wind turbine according to the invention. The wind turbine 100 has a tower 102 and a nacelle 104. Disposed on the nacelle 104 there is a rotor 106, which has three rotor blades 108 and a spinner 110. When in operation, the rotor 106 is put into a rotary motion by the wind, and thereby drives an electric generator in the nacelle 104. The rotor blade has a front edge 108a and a rear edge 108b.

FIG. 2 shows a schematic block diagram of a wind turbine according to the invention. The wind turbine 100 according to the invention has a generator 200, a control unit 300, a blade heating system 400 for heating at least a portion of the rotor blades 108, and a plurality of sensors 500. The sensors 500 have at least one temperature sensor 510 for sensing the temperature in the vicinity, or in the environment, of the wind turbine, and have an air humidity sensor 520, which is provided to sense the air humidity in the vicinity, or in the environment, of the wind turbine 100. The measurement results of the sensors 500 are forwarded to the control unit 300, which then, on the basis of these measurement results, activates the blade heating system 400 to heat the rotor blades 108.

Figure 1:
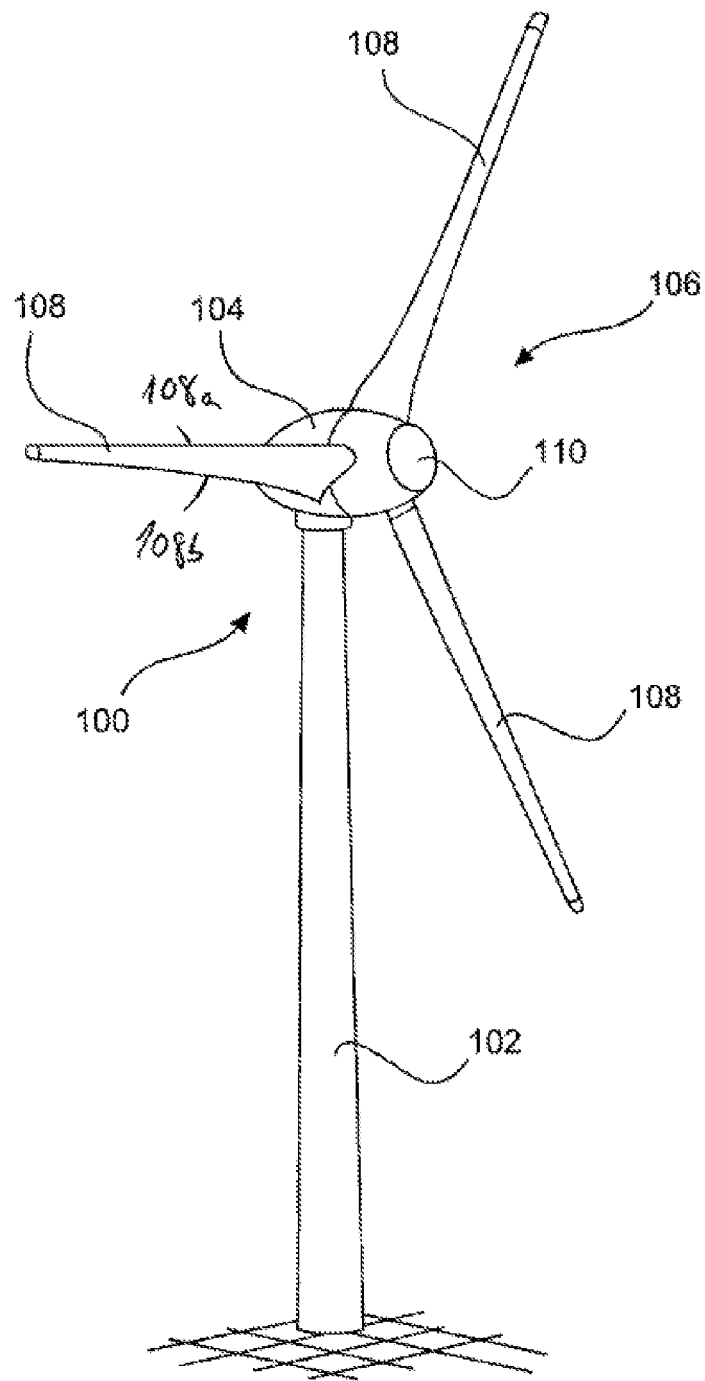
FIG. 1 shows a wind turbine according to the invention.
Figure 2:
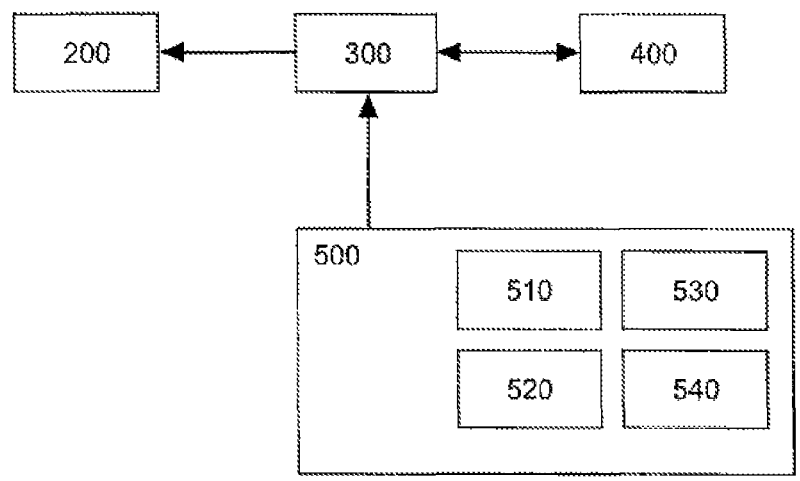
FIG. 2 shows a schematic block diagram of a wind turbine according to the invention.

The blade heating system 400 is thus controlled, or activated, in dependence on the external temperature and the relative air humidity. By preventive activation of the blade heating system 400, a build-up of ice on the aerodynamically relevant regions of the rotor blade can be prevented before it occurs. For this purpose, the blade heating system 400 is activated, and the rotor blades are heated, at least at the aerodynamically relevant regions. This aerodynamically relevant region is, in particular, the front edge region of the rotor blades. Regions that are aerodynamically less relevant, such as, for example, the rear edge region of the rotor blades, may also optionally be kept free of ice by the blade heating system 400. This, however, is merely optional.

According to the invention, the preventive blade heating by the blade heating system 400 is activated when the control unit 300 for controlling the operation of the wind turbine is in an automatic operating mode. For example, the limit values for the air humidity and for the external temperature can be filed, or stored, in the control unit 300. According to one exemplary embodiment of the invention, the blade heating system 400 is activated in the case of an air humidity of more than 70% and in the case of an external temperature of <+5° C.; optionally, the blade heating system is activated in the case of an external temperature of ≤+2° C. and from an air humidity of ≥95%.

Optionally, an air pressure sensor 540 may be provided, as well as sensors 530 for monitoring an access to the wind turbine.

According to the invention, the limit value for the air humidity and for the external temperature may be selected in dependence on the installation site of the wind turbine.

The higher the temperature (or the limit value), the sooner the rotor blade heating system is activated. The higher the air humidity (or the limit value), the later the heating system is activated.

Optionally, the sensor for the external temperature and the sensor for the relative humidity (humidity sensor) may be provided adjacently, and in the nacelle. There is already an external temperature sensor present in the case of existing wind turbines, such that only a sensor for the relative air humidity need be retrofitted.

According to the invention, the blade heating system 400 is activated by the control unit 300 if the external temperature sensed by the temperature sensor 510 is ≤+2° C. and the relative air humidity is ≥70%, i.e. the blade heating system is optionally activated if the temperature is below a limit value for the temperature and a limit value for the air humidity is exceeded. The activation of the blade heating system 400 by the control unit 300 can be effected irrespective of whether the wind turbine is in operation or at a standstill. Preferably, the energy required for the blade heating system 400 is provided, first of all, by the power generated by the wind turbine.

The blade heating system 400 may be designed, in particular, in such a manner that aerodynamically relevant portions such as, for example, the front edge 108a are heated, in order to avoid ice accretion.

According to the invention, a maximum power consumption can be assigned to the blade heating system 400. In the event of the wind turbine not supplying sufficient electrical power, e.g. because there is no wind, the electrical power required for the blade heating system 400 can be taken from the power supply grid. This, however, only applies up to the previously defined maximum permissible power of the blade heating system 400.

According to one aspect of the present invention, the control unit 300 can be designed to sense an ice build-up on the rotor blades 108 of the wind turbine 100 by comparing the current power curve with a stored power curve. As an alternative to this, other known methods of identification of ice build-up are possible. If a build-up of ice on the rotor blades 108 is sensed, despite the preventive blade heating system 400 having been activated, the wind turbine 100 can be stopped in an emergency. In this case, the control unit 300 can switch over from a preventive blade heating mode to automatic blade de-icing, such that the rotor blades 108 are de-iced by the blade heating system 400. When the blade de-icing operation is complete, the control unit 300 can switch back to an automatic operating mode, and a preventive blade heating system 400 can be activated according to the external temperature and the air humidity.

According to a further aspect of the present invention, the control unit 300 can activate or deactivate the preventive blade heating system 400 as soon as a service switch is switched on, a stop switch is activated, or the wind turbine is entered by service personnel. For this purpose, corresponding sensors 530 can be provided on a service switch of the wind turbine, on a stop switch or on the door of the wind turbine. When the service personnel have left the wind turbine again and the normal operation of the wind turbine has been reactivated, the control unit 300 will activate the preventive blade heating system 400 if the external temperature drops below the limit value and the relative air humidity is greater than the limit value.

According to the invention, a sensor 540, for determining the air pressure in the vicinity, or environment, of the wind turbine may optionally be provided. The control unit 300 can be designed to influence the operation of the blade heating system 400 in dependence on the air pressure sensed by the air pressure sensor 540.

According to a further exemplary embodiment, the control unit activates the blade heating system if the temperature drops below a limit value of 2° C. and the gradient of the air humidity exceeds a limit value. The greater the gradient of the air humidity, the sooner must the blade heating system be activated. Thus, not only the temperature, but also the air humidity gradient, i.e. the progression of the air humidity over time, is taken into account in the activation of the blade heating system.

The blade heating system according to the invention may be designed as an air heating system, as heating mats, etc.

The invention claimed is:

1. A wind turbine, having
   at least one rotor blade,
   a blade heating system for heating at least a portion of the at least one rotor blade,
   at least one temperature sensor for sensing the external temperature in the region, or in the environment, of the wind turbine,
   at least one air humidity sensor for sensing the air humidity in the region, or in the environment, of the wind turbine, and
   a control unit for activating the blade heating system for preventing ice formation on the at least one rotor blade if the temperature falls below a temperature limit value of +5° C. and if an air humidity limit value of 70% is exceeded, wherein the control unit is configured to sense an ice build-up on the rotor blades by comparing a current power curve with a stored power curve, and wherein the control unit is further configured to stop the wind turbine if an ice build-up has been detected even if the blade heating system has already been activated by the control unit.

2. The wind turbine according to claim 1,
   the blade heating system being designed to heat a front edge of the at least one rotor blade.

3. A method for operating a wind turbine having at least one rotor blade, a blade heating system for heating at least a portion of the at least one rotor blade, and at least one air humidity sensor for sensing the air humidity in the region of the wind turbine, comprising the steps:
   measurement of the external temperature in the region of the wind turbine by at least one temperature sensor, measurement of the air humidity in the region of the wind turbine by the at least one air humidity sensor, activation of the blade heating system for preventing ice formation on the at least one rotor blade if the temperature falls below a temperature limit value of +5° C. and if an air humidity limit value of 70% is exceeded, sensing an ice build-up on the rotor blades by comparing a current power curve with a stored power curve, and stopping the wind turbine if an ice build-up has been detected even if the blade heating system has already been activated by the control unit.

4. The wind turbine according to claim 2,
the blade heating system being designed to heat a front edge of the at least one rotor blade.

5. The wind turbine according to claim 1, wherein the control unit is configured to switch from a preventive blade heating mode to an automatic blade de-icing mode if the control unit has sensed an ice build-up on the rotor blades.

* * * * *